(12) United States Patent
Safai (10) Patent No.: US 10,996,165 B1
(45) Date of Patent: May 4, 2021

(54) APPARATUS AND METHOD FOR MEASURING UV COATING EFFECTIVENESS

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/824,312

(22) Filed: Mar. 19, 2020

(51) Int. Cl.
*G01N 21/33* (2006.01)

(52) U.S. Cl.
CPC ....... *G01N 21/33* (2013.01); *G01N 2201/061* (2013.01)

(58) Field of Classification Search
CPC .................. G01N 21/33; G01N 2201/061
USPC .................................................... 250/339.11
See application file for complete search history.

(56) References Cited

U.S. PATENT DOCUMENTS

| | | | | |
|---|---|---|---|---|
| 5,331,169 A * | 7/1994 | Tanaka | G01N 21/88 | 250/372 |
| 5,605,738 A * | 2/1997 | McGinness | B41M 3/144 | 250/365 |
| 5,717,216 A * | 2/1998 | McCoy | G01B 11/0633 | 250/372 |
| 5,940,173 A * | 8/1999 | Tomii | G01N 21/95 | 356/445 |
| 6,275,292 B1 * | 8/2001 | Thakur | G01B 11/303 | 250/339.07 |
| 6,483,585 B1 * | 11/2002 | Yang | G01B 11/065 | 356/369 |
| 10,574,180 B2 * | 2/2020 | De Vos | G01B 11/30 | |
| 2001/0017698 A1 * | 8/2001 | Thakur | G01B 11/303 | 356/600 |
| 2005/0104004 A1 * | 5/2005 | Takeuchi | G01J 1/0411 | 250/372 |
| 2006/0054836 A1 * | 3/2006 | Tezuka | G01N 21/47 | 250/372 |
| 2006/0138338 A1 * | 6/2006 | Tezuka | G01N 21/9501 | 250/372 |
| 2010/0260926 A1 * | 10/2010 | Wolfe | G01N 21/8422 | 427/8 |
| 2010/0277786 A1 * | 11/2010 | Anderson | G02B 5/3058 | 359/247 |
| 2013/0265572 A1 * | 10/2013 | Delgado | G01N 21/956 | 356/237.5 |
| 2015/0002653 A1 * | 1/2015 | Hwang | G01N 21/8851 | 348/86 |
| 2016/0010212 A1 * | 1/2016 | Dubost | C23C 16/483 | 427/8 |
| 2016/0282280 A1 * | 9/2016 | Foad | G01N 21/95 | |

(Continued)

*Primary Examiner* — Mark R Gaworecki
(74) *Attorney, Agent, or Firm* — Kunzler Bean & Adamson (57) ABSTRACT

Disclosed herein is a method of measuring an effectiveness of an ultraviolet coating. The method comprises irradiating the UV coating with UV energy comprising a predetermined spectrum of wavelengths. The method also comprises measuring an intensity of the UV energy reflected from the UV coating. The method further comprises comparing a measured intensity of the UV energy reflected from the UV coating with a previously measured intensity of the UV energy reflected from the UV coating to obtain comparison data. The method additionally comprises determining, in response to the comparison data, the effectiveness of the UV coating.

20 Claims, 5 Drawing Sheets

(56) References Cited

U.S. PATENT DOCUMENTS

| | | | |
|---|---|---|---|
| 2017/0050208 A1* | 2/2017 | Nichols | B25J 9/1679 |
| 2018/0286643 A1* | 10/2018 | Tuitje | G01B 11/0625 |
| 2019/0107384 A1* | 4/2019 | Ygartua | G01B 11/0641 |
| 2019/0162523 A1* | 5/2019 | Hong | G01B 11/0675 |
| 2019/0287237 A1* | 9/2019 | de Bonfim Gripp | G06T 7/136 |
| 2020/0116474 A1* | 4/2020 | Maier | G01B 7/105 |

* cited by examiner

APPARATUS AND METHOD FOR MEASURING UV COATING EFFECTIVENESS

FIELD

This disclosure relates generally to a method and apparatus for determining an effectiveness of a surface coating, and more particularly to quantifying a level of ultraviolet (UV) degradation of a surface coating using UV transmissivity and reflectance.

BACKGROUND

Vehicles, including air-borne vehicles, whose composite exteriors are made of, in part, organic polymer materials, are susceptible to ultraviolet (UV) degradation over long periods of exposure. Although a vehicle often includes a protective coating, chemical degradation of the coating and the composite exterior begins as soon as the vehicle is exposed to UV light (e.g., sunlight or other sources including metal halide light sources). This degradation affects the strength of the composite exterior and/or the adhesion of the coating on the composite exterior. Degradation can take many years and is dependent on many conditions including flight path, environment, storage location, etc. Such variability makes it difficult to determine longevity of the protective coating.

SUMMARY

The subject matter of the present application provides examples of an apparatus and method for measuring UV coating effectiveness that overcome the above-discussed shortcomings of prior art techniques. The subject matter of the present application has been developed in response to the present state of the art, and in particular, in response to shortcomings of conventional methods of predicting the condition and longevity of UV coatings.

Disclosed herein is a method of measuring an effectiveness of an ultraviolet coating. The method comprises irradiating the UV coating with UV energy comprising a predetermined spectrum of wavelengths. The method also comprises measuring an intensity of the UV energy reflected from the UV coating. The method further comprises comparing a measured intensity of the UV energy reflected from the UV coating with a previously measured intensity of the UV energy reflected from the UV coating to obtain comparison data. The method additionally comprises determining, in response to the comparison data, the effectiveness of the UV coating. The preceding subject matter of this paragraph characterizes example 1 of the present disclosure.

The predetermined spectrum of wavelengths is from about 100 nanometers to about 400 nanometers. The preceding subject matter of this paragraph characterizes example 2 of the present disclosure, wherein example 2 also includes the subject matter according to example 1, above.

The UV energy, irradiating the UV coating, is provided by a tunable UV generator. The preceding subject matter of this paragraph characterizes example 3 of the present disclosure, wherein example 3 also includes the subject matter according to any one of examples 1-2, above.

The UV coating forms an exterior layer of a vehicle, and the UV coating comprises an organic polymer coating. The preceding subject matter of this paragraph characterizes example 4 of the present disclosure, wherein example 4 also includes the subject matter according to any one of examples 1-3, above.

The method further comprises determining an initial intensity of the UV energy reflected from the UV coating subsequent to the coating of the exterior layer of the vehicle. The initial intensity is determined prior to a measurement of the previously measured intensity. The preceding subject matter of this paragraph characterizes example 5 of the present disclosure, wherein example 5 also includes the subject matter according to example 4, above.

The method further comprises determining a degradation of the UV coating based on a comparison of the initial intensity and the previously measured intensity. The effectiveness is based on the determined degradation. The preceding subject matter of this paragraph characterizes example 6 of the present disclosure, wherein example 6 also includes the subject matter according to example 5, above.

The method further comprises calculating the measured intensity of the UV energy reflected from the UV coating based on an absorbance, a transmittance, and a reflectance of the UV energy reflected from the UV coating. The preceding subject matter of this paragraph characterizes example 7 of the present disclosure, wherein example 7 also includes the subject matter according to example 6, above.

The method further comprises predicting, based on the effectiveness of the UV coating, a future effectiveness of the UV coating. The preceding subject matter of this paragraph characterizes example 8 of the present disclosure, wherein example 8 also includes the subject matter according to any one of examples 1-7, above.

The UV coating is applied onto vehicles of a fleet of vehicles. The method further comprises maintaining a history of measured UV intensities for each vehicle in the fleet of vehicles. The preceding subject matter of this paragraph characterizes example 9 of the present disclosure, wherein example 9 also includes the subject matter according to any one of examples 1-8, above.

Additionally disclosed herein is a system for measuring an effectiveness of an ultraviolet coating. The system comprises a UV generator configured to irradiate the UV coating with UV energy. The system also comprises a UV sensor configured to measure an intensity of the UV energy reflected from the UV coating. The system further comprises a UV analyzer configured to compare a measured intensity with a previously measured intensity of the UV energy reflected from the UV coating to obtain comparison data, and to determine, in response to the comparison data, the effectiveness of the UV coating. The preceding subject matter of this paragraph characterizes example 10 of the present disclosure.

The UV energy comprises energy having a predetermined spectrum of wavelengths from about 100 nanometers to about 400 nanometers. The preceding subject matter of this paragraph characterizes example 11 of the present disclosure, wherein example 11 also includes the subject matter according to example 10, above.

The UV analyzer is further configured to determine an initial intensity of the UV energy reflected from the UV coating subsequent to an application of the UV coating on an exterior layer of a vehicle. The initial intensity is determined prior to a measurement of the previously measured intensity. The preceding subject matter of this paragraph characterizes example 12 of the present disclosure, wherein example 12 also includes the subject matter according to any one of examples 10-11, above.

The UV analyzer is further configured to determine a degradation of the UV coating based on a comparison of the initial intensity and the measured intensity, wherein the effectiveness is based on the determined degradation. The preceding subject matter of this paragraph characterizes example 13 of the present disclosure, wherein example 13 also includes the subject matter according to example 12, above.

The UV analyzer is further configured to calculate the measured intensity based on an absorbance, a transmittance, and a reflectance of the UV energy from the UV coating and the exterior layer of the vehicle. The preceding subject matter of this paragraph characterizes example 14 of the present disclosure, wherein example 14 also includes the subject matter according to example 13, above.

The UV coating is applied onto vehicles of a fleet of vehicles. The UV analyzer is further configured to maintain a history of measured UV intensities for each vehicle in the fleet of vehicles. The preceding subject matter of this paragraph characterizes example 15 of the present disclosure, wherein example 15 also includes the subject matter according to any one of examples 10-14, above.

The UV generator comprises a tunable UV generator. The preceding subject matter of this paragraph characterizes example 16 of the present disclosure, wherein example 16 also includes the subject matter according to any one of examples 10-15, above.

Additionally disclosed herein is an apparatus comprising at least one computing device that is configured for performing actions. The at least one computing device includes a processor and a local memory. The actions comprise irradiating a UV coating with UV energy comprising a predetermined spectrum of wavelengths. The actions also comprise measuring an intensity of the UV energy reflected from the UV coating. The actions further comprise comparing a measured intensity of the UV energy reflected from the UV coating with a previously measured intensity of the UV energy reflected from the UV coating to obtain comparison data. The actions further comprise determining, in response to the comparison data, an effectiveness of the UV coating. The preceding subject matter of this paragraph characterizes example 17 of the present disclosure.

The predetermined spectrum of wavelengths is from about 100 nanometers to about 400 nanometers. The preceding subject matter of this paragraph characterizes example 18 of the present disclosure, wherein example 18 also includes the subject matter according to example 17, above.

The apparatus further comprises determining an initial intensity of the UV energy reflected from the UV coating subsequent to an application of the UV coating on an exterior layer of a vehicle. The initial intensity is determined prior to a measurement of the previously measured intensity. The preceding subject matter of this paragraph characterizes example 19 of the present disclosure, wherein example 19 also includes the subject matter according to any one of examples 17-18, above.

The actions further comprise determining a degradation of the UV coating based on a comparison of the initial intensity and the previously measured intensity. The effectiveness is based on the determined degradation. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
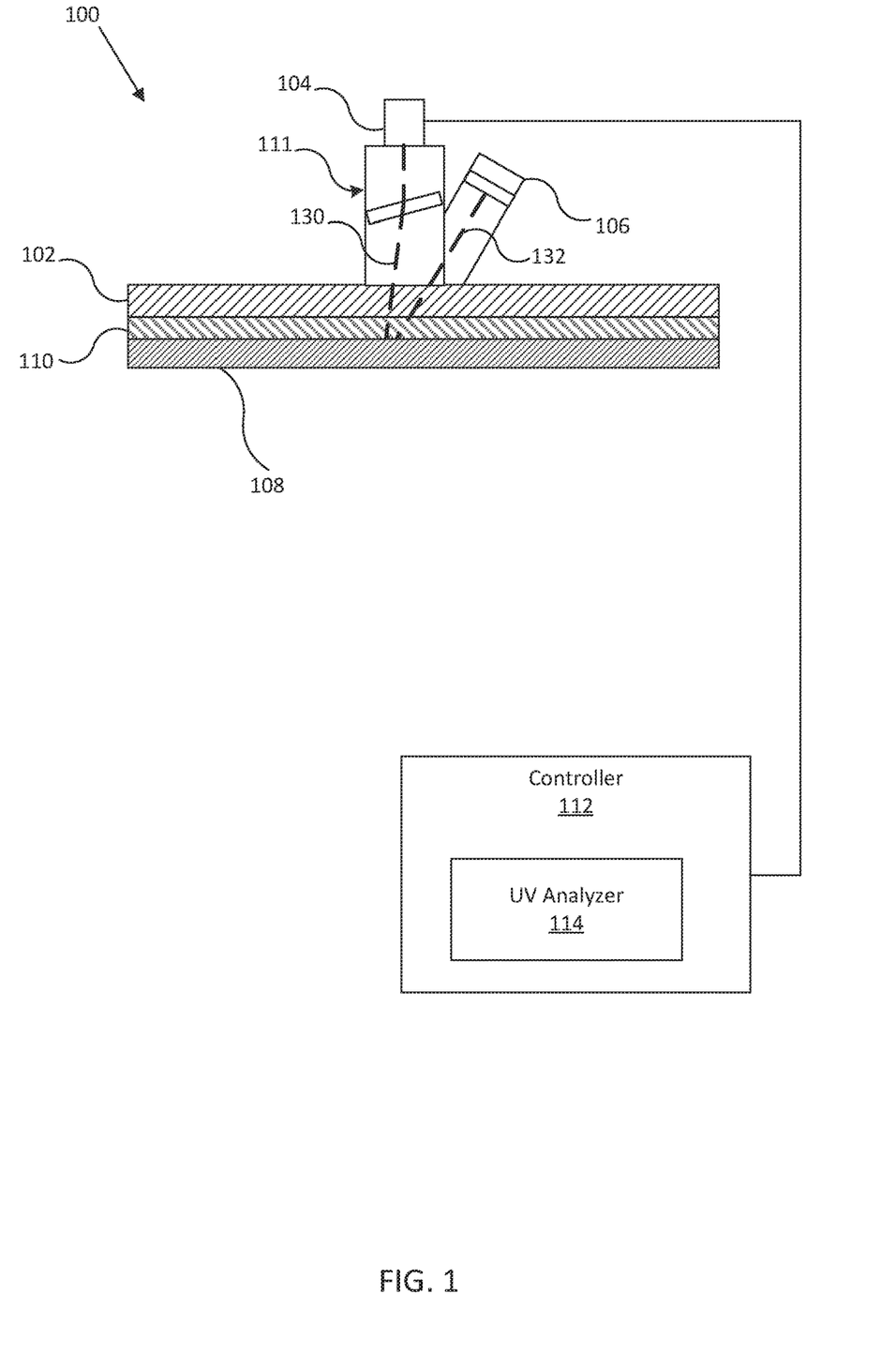
FIG. 1 is a schematic block diagram illustrating a system for measuring the effectiveness of an ultraviolet (UV) coating, according to one or more examples of the subject disclosure.

Referring to FIG. 1, one example of a system 100 for measuring an effectiveness of an ultraviolet (UV) coating 102 is shown. In certain examples, UV coating effectiveness is determined using a UV generator 104 and a UV sensor 106. The UV generator 104 and the UV sensor 106 cooperate to measure, over time, absorbance, reflectance, and transmissivity of UV energy that is irradiated to an exterior layer 108 of a structure. In some examples, the structure is a composite body made of, at least in part, an organic material component. Over time, UV energy, from the sun for example, causes damage to the organic component (e.g., the polymer resin) of composite materials. Vehicles, such as aircraft (see, e.g., FIG. 5) that are partially made of composite materials and constantly exposed to UV energy are coated with the UV coating (e.g., a coat of paint) to protect the composite materials. Stated differently, the UV coating 102 is applied onto the vehicle to protect the exterior layer 108 of the vehicle from the sun.

As will be described in greater detail below, the system 100 is configured for determining the effectiveness of the UV coating 102 by measuring how much of irradiated UV energy from the UV generator 104 is absorbed into the exterior layer 108 and how much is reflected back to the UV sensor 106. By knowing an original or initial intensity (based on the reflectance, absorption, and transmissivity), the system 100 is able to make a comparison and determine an effectiveness and predict future degradation (e.g., longevity) of the UV coating 102. The initial intensity, in certain examples, is obtained subsequent to the coating of the vehicle and prior to exposure of the vehicle to UV energy from the sun. Should the effectiveness of the UV coating 102 fall below a predetermined threshold, preventative steps (e.g., repainting the aircraft) can be exercised to avoid further degradation of the UV coating 102 and increased UV exposure to the exterior layer 108.

In certain examples, the UV generator 104 and the UV sensor 106 also measure UV degradation to a primer 110 that helps with adhesion of the UV coating 102 to the exterior layer 108. In some examples, the UV coating 102 is incorporated into paint that is used to paint the exterior layer 108. It will be appreciated that although this subject disclosure explains determining an effectiveness of the UV coating 102, and a corresponding level of degradation, with reference to aircraft vehicles, the subject disclosure can be beneficially used to quantify a level of UV exposure degradation to organic containing surfaces in general.

The UV generator 104, in certain examples is a tunable UV generator 104 and is configured to produce and irradiate the UV coating 102 and the exterior layer 108 with UV energy in a predetermined spectrum of wavelengths. One example of a suitable UV generator 104 for use in examples of the subject disclosure is a tunable UV laser. The predetermined spectrum of wavelengths may include all or a portion of the wavelengths between about 100 nanometers and about 400 nanometers. As used herein, the term "about," when used in connection with a numerical value, refers to variations of ±10% from the specified value. The UV generator 104, in certain examples, is configured to provide UV energy at wavelengths that match the UV wavelengths of sunlight that are considered to be the most harmful to the UV coating 102.

The UV generator 104 is configured, in certain examples, to provide the UV energy to the UV coating 102 and the exterior layer 108 at a predetermined incident angle to allow for the collection of the reflected energy by the UV sensor 106. The UV generator 104 and UV sensor 106, in certain examples, are part of a hand-held unit 111 that is portable and easily carried and moved about on the exterior layer 108 of the vehicle by an average person.

In certain examples, the UV generator 104 and the UV sensor 106 are operatively coupled to a controller 112 over a wired or wireless communication bus, as will be described in greater detail below with reference to FIG. 3. The controller 112 is configured to control the UV generator 104 and the UV sensor 106 to generate, at a predetermined spectrum of wavelengths, UV energy 130 and measure, via the UV sensor 106, reflectance and transmissivity of reflected UV energy 132 or UV energy reflected from the exterior layer 108. For example, incident UV energy 130 from the UV generator 104 is provided at various incident angles over a variety of wavelengths and its corresponding reflected UV energy 132 is measured by the UV sensor 106.

The comparison data associated with the measured UV energy (incident angle, reflected angle, reflected intensity, transmissivity, absorbed energy, temperature, humidity, etc.) is recorded by a UV analyzer 114 of a controller 112. The UV analyzer 114, in certain examples, is configured to maintain the data and calculate a UV coating effectiveness of the UV coating 102, the primer 110, or both the UV coating 102 and the primer 110. The UV analyzer 114 is discussed in greater detail below with reference to FIG. 2.

Figure 2:
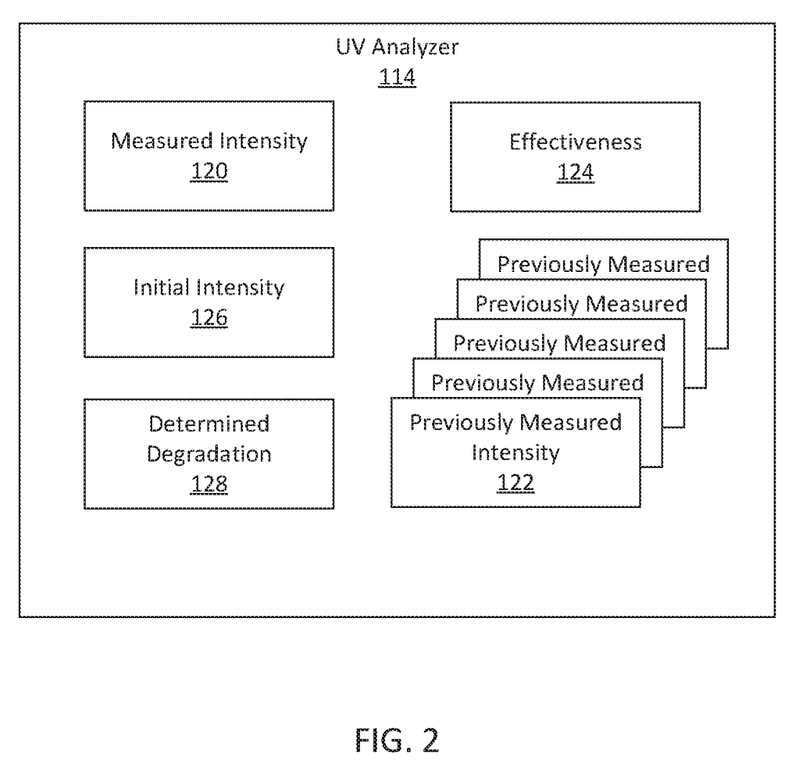
FIG. 2 is a schematic block diagram illustrating a UV analyzer of a controller of the system of FIG. 1, according to one or more examples of the subject disclosure.

Referring now to FIG. 2, shown is a schematic block diagram of the UV analyzer 114, according to examples of the subject disclosure. The UV analyzer 114 is configured to measure and track an intensity ("measured intensity 120") of UV energy that is irradiated from the vehicle. The measured intensity 120, in certain examples, is based on absorptivity, reflectivity, and transmissivity of the UV energy. Absorbance is a measure of the amount of UV energy that is absorbed by the UV coating 102 and the exterior layer 108 of the composite body. In some examples, absorbance, transmittance, and reflectance are determined by the UV analyzer 114 by taking measurements of the UV energy intensity before and after exposure to the exterior layer 108.

In certain examples, the UV analyzer 114 is configured to maintain previously measured UV intensities 122 of the vehicle. For example, the UV analyzer 114 is configured to maintain a lookup table of measured intensities 120. In some examples, the UV analyzer 114 is configured to maintain previously measured intensities 122 for a fleet of vehicles (see FIG. 5). Accordingly, the UV analyzer 114 is configured to analyze and compare a previously measured intensity 122 with the currently measured intensity 120 to determine an effectiveness 124. In certain examples, the UV analyzer 114 also maintains an initial intensity 126. The initial intensity 126 is a measured intensity 120 taken after the UV coating 102 is applied to the vehicle, and before the vehicle is used. In other words, the initial intensity 126 is measured as part of a manufacturing process of the vehicle.

A determined degradation 128 of the UV coating 102 is based on, in certain examples, the initial intensity 126, the previously measured intensities 122 (i.e., intensity history), and the current measured intensity 120. The UV analyzer 114 is configured, in some examples, to calculate the determined degradation 128 using different quantification methodologies including, but not limited to, linear regression, multiple linear regression, stepwise linear regression, etc. The determined degradation 128, for example, is a percentage of the measured intensity 120 compared to the initial intensity 126. The effectiveness 124, in some examples, is based on the determined degradation.

In certain examples, the UV analyzer 114 is configured to determine a predicted longevity of the UV coating 102. The predicted longevity, or future effectiveness, is based on the initial intensity 126, the measured intensity 120, and the previously measured intensities 122. As the measured intensity 120 decreases over time, the UV analyzer 114 is configured to estimate when the UV coating 102 will reach a predetermined threshold. Various factors besides the measured intensity 120 and the previously determined intensities 122 are a factor in the determination including, but not limited to, the color of the UV coating 102, the geographical location of the vehicle, and in the case of an aircraft, the hemisphere in which the aircraft operates. The UV analyzer 114 considers geographical locations, in some examples, because areas of the world with higher ozone concentrations cause faster degradation due to UV light.

Figure 3:
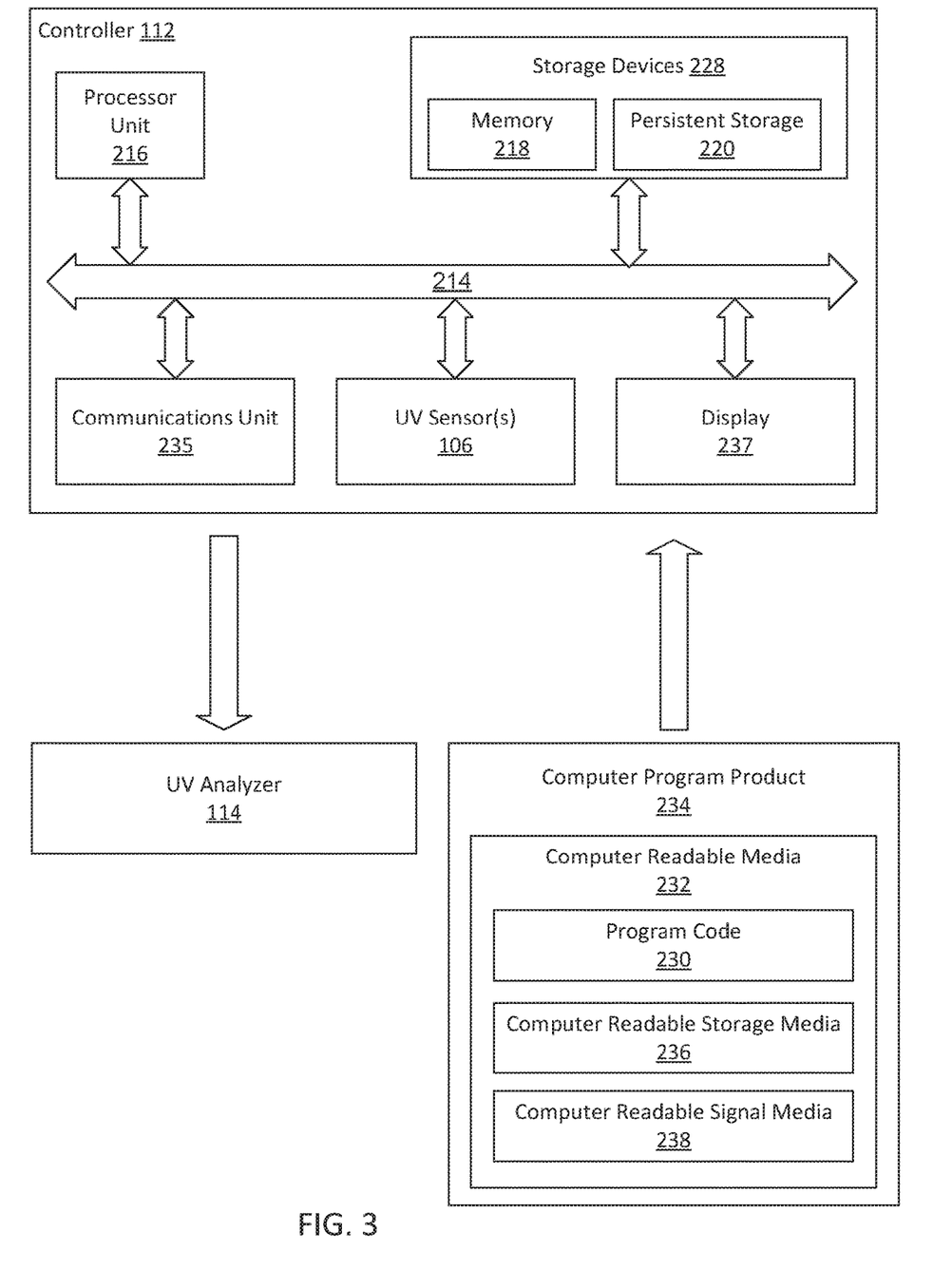
FIG. 3 is schematic block diagram illustrating a controller of the system of FIG. 1, according to one or more examples of the subject disclosure.

FIG. 3 is a schematic block diagram illustrating a controller 112, according to examples of the subject disclosure. The controller 112 is an example of a computing device, which, in some examples, is used to implement one or more components of examples of the disclosure, and in which computer usable program code or instructions implementing the processes can be located for the illustrative examples. In this illustrative example, the controller includes a communications fabric 214, which provides communications between a processor unit 216, memory 218, UV sensor(s) 106 (and other sensors such as temperature sensors and optical sensors), persistent storage 220, a communications unit 235, and a display 237. The UV sensor 106, in certain examples, is configured to detect photons irradiated from the UV generator 104 and reflected off of the vehicle.

The processor unit 216 serves to execute instructions for software that are loaded into the local memory 218 in some examples. In one example, the processor unit 216 is a set of one or more processors or can be a multi-processor core, depending on the particular implementation. Further, the processor unit 216 is implemented using one or more heterogeneous processor systems, in which a main processor is present with secondary processors on a single chip, according to some examples. As another illustrative example, the processor unit 216 is a symmetric multi-processor system containing multiple processors of the same type.

Memory 218 and persistent storage 220 are examples of storage devices 228. A storage device is any piece of hardware that is capable of storing information, such as, for example, without limitation, data, program code in functional form, and/or other suitable information either on a temporary basis and/or a permanent basis. Memory 218, in these examples, is a random-access memory, or any other suitable volatile or non-volatile storage device. Persistent storage 220 takes various forms, depending on the particular implementation. In one example, persistent storage 220 contains one or more components or devices. In an example, persistent storage 220 is a hard drive, a flash memory, a rewritable optical disk, a rewritable magnetic tape, or some combination of the above. The media used by persistent storage 220 is removable in some examples. For example, a removable hard drive is used for persistent storage 220 in various implementations.

The communications unit 235, in these examples, provides for communication with other data processing systems or devices. In these examples, the communications unit 235 is a network interface card. The communications unit 235 provides communications through the use of either, or both, physical and wireless communications links. In some examples, the communication unit 235 also provides a connection for user input through a keyboard, a mouse, and/or some other suitable input device. Further, the input/output unit sends output to a printer or receive input from any other peripheral device in various examples. The display 237 provides a mechanism to display information to a user.

In some examples, instructions for the operating system, applications, and/or programs are located in the storage devices 228, which are in communication with the processor unit 216 through the communications fabric 214. In these illustrative examples, the instructions are in a functional form on persistent storage 220. These instructions are loaded into memory 218 for execution by the processor unit 216 in some examples. In certain examples, the processes of the different examples are performed by the processor unit 216 using computer implemented instructions, which is located in a memory, such as the memory 218.

These instructions are referred to as program code, computer usable program code, or computer readable program code that can be read and executed by a processor in the processor unit 216. The program code, in the different examples, is embodied on different physical or computer readable storage media, such as the memory 218 or the persistent storage 220.

Program code 230 is located in a functional form on computer readable media 232 that is selectively removable and can be loaded onto or transferred to the controller 112 for execution by the processor unit 216. In some examples, the program code also contains the curing plan discussed above. The program code 230 and computer readable media 232 form computer program product 234. In one example, the computer readable media 232 is a computer readable storage media 236 or a computer readable signal media 238. The computer readable storage media 236 includes, in one example, an optical or magnetic disc that is inserted or placed into a drive or other device that is part of the persistent storage 220 for transfer onto a storage device, such as a hard drive, that is part of the persistent storage 220. In other examples, the computer readable storage media 236 also takes the form of a persistent storage, such as a hard drive, a thumb drive, or a flash memory that is connected to the controller 112. In some instances, the computer readable storage media 236 is not removable from the controller 112.

Alternatively, the program code 230 is transferred to the controller 112 using computer readable signal media 238. Computer readable signal media 238 is, as one example, a propagated data signal containing program code 230. For example, the computer readable signal media 238 is an electromagnetic signal, an optical signal, and/or any other suitable type of signal in one example. These signals are transmitted over communications links, such as wireless communication links, an optical fiber cable, a coaxial cable, a wire, and/or any other suitable type of communications link. In other words, the communications link and/or the connection is physical or wireless in the illustrative examples. The computer readable media also takes the form of non-tangible media, such as communications links or wireless transmissions containing the program code, in some examples.

In some illustrative examples, the program code 230 is downloaded over a network to the persistent storage 220 from another device or data processing system through the computer readable signal media 238 for use within the controller 112. In one instance, program code stored in a computer readable storage media in a server data processing system is downloaded over a network from a server to the controller 112. According to various examples, the system providing the program code 230 is a server computer, a client computer, or some other device capable of storing and transmitting program code 230.

The different components illustrated for the controller 112 are not meant to provide physical or architectural limitations to the manner in which different examples can be implemented. The different illustrative examples can be implemented in a controller including components in addition to and/or in place of those illustrated for the controller 112. Other components shown in FIG. 3 can be varied from the illustrative examples shown. The different examples can be implemented using any hardware device or system capable of executing program code. For example, a storage device in the controller 112 is any hardware apparatus that can store data. The memory 218, persistent storage 220, and the computer readable media 232 are examples of storage devices in a tangible form.

In another example, a bus system is used to implement communications fabric 214 and can be comprised of one or more buses, such as a system bus or an input/output bus. Of course, in some examples, the bus system is implemented using any suitable type of architecture that provides for a transfer of data between different components or devices attached to the bus system. In addition examples, a communications unit includes one or more devices used to transmit and receive data, such as a modem or a network adapter. Further, a memory is, for example, the memory 218 or a cache such as found in an interface and memory controller hub that can be present in the communications fabric 214.

Computer program code for carrying out operations for aspects of the subject disclosure can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
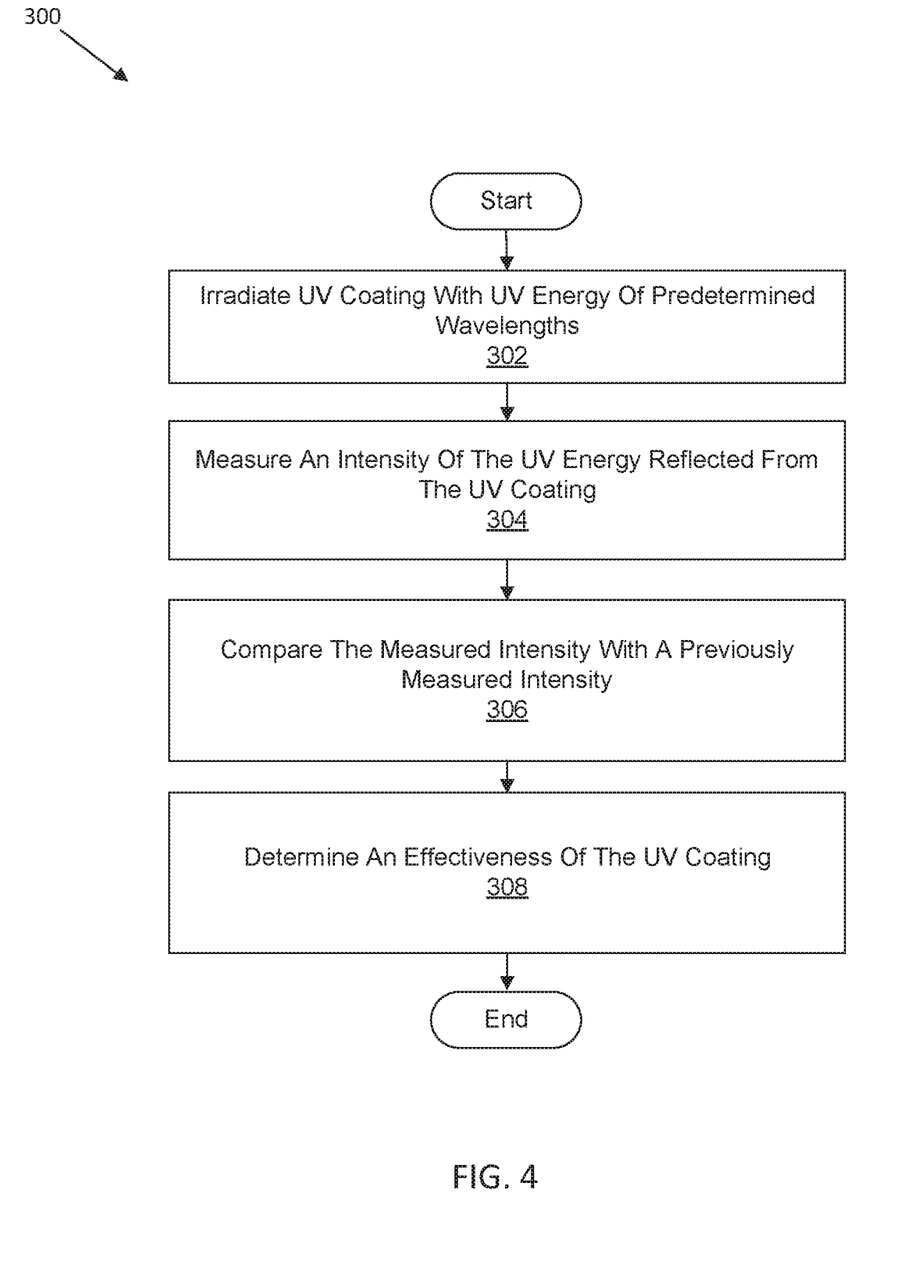
FIG. 4 is a flowchart diagram illustrating a method of measuring a UV coating effectiveness, according to examples of the subject disclosure.

Referring now to FIG. 4, one example of a method 300 for determining a UV coating effectiveness is shown. The method 300, in certain examples, is performed by processing logic that may comprise hardware (circuitry, dedicated logic, etc.), software (such as is run on a general-purpose computing system or a dedicated machine), or a combination of both. In one embodiment, the UV analyzer 114 performs the method 300.

In certain examples, the processing logic begins the method 300 at block 302 by irradiating the UV coating 102 with UV energy of a predetermined spectrum of wavelengths. The predetermined spectrum of wavelengths, in some examples, is selected from wavelengths in the range of between about 100 nm and about 400 nm. In certain examples, the predetermined spectrum of wavelengths is selected to mimic the most harmful UV wavelengths of sunlight.

At block 304, the processing logic measures an intensity of reflected UV energy from the UV coating 102. The measured intensity 120 in some examples is based on a quantity of detected photons. In some examples, the measured intensity 120 is based on a calculation based on absorptivity, reflectivity, and transmissivity. The processing logic, at block 306 then compares the measured intensity 120 with a previously measured intensity 122. In some examples, the previously measured intensity 122 includes a history of all previously measured intensities 122. At block 308, the processing logic determines the effectiveness 124 of the UV coating 102. In certain examples, the effectiveness 124 of the UV coating 102 is based on the comparison of the measured intensity 120 and the previously measured intensity 122. The effectiveness 124, in certain examples is a ratio of the measured intensity 120 compared to the initial intensity 126 or to one of the previously measured intensity 122 values.

Figure 5:
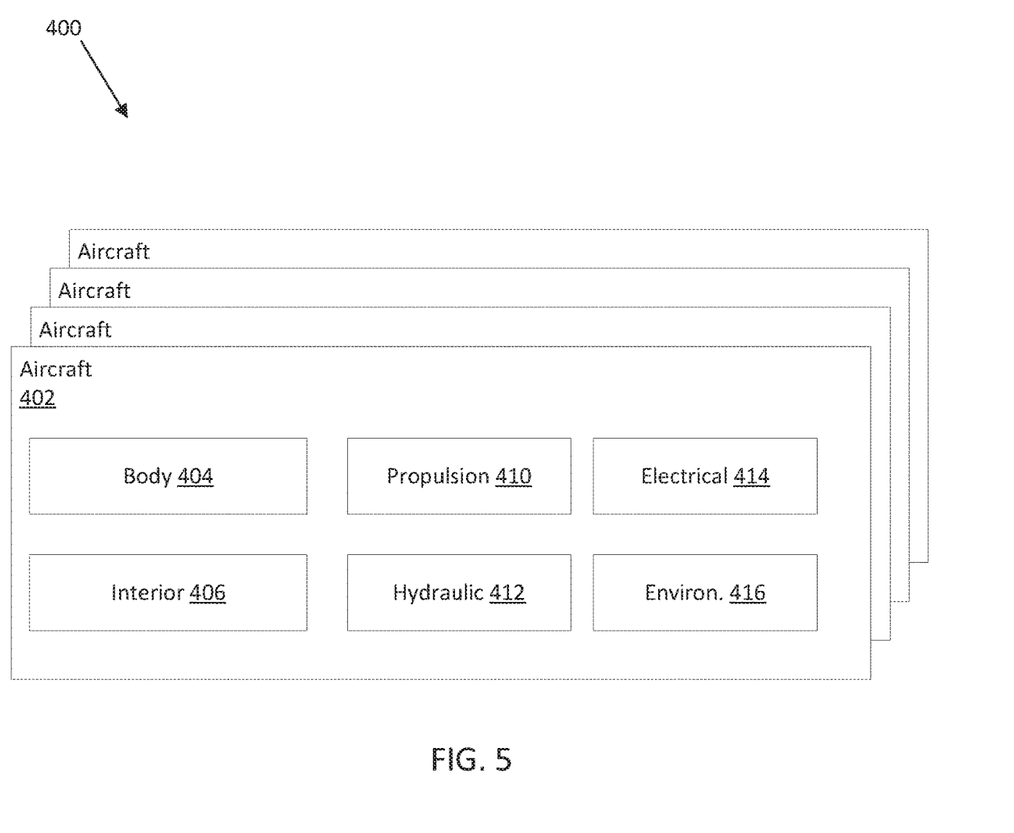
FIG. 5 is a schematic block diagram illustrating a fleet of aircraft vehicles, according to examples of the subject disclosure.

FIG. 5 is a schematic block diagram illustrating one example of a fleet 400 of aircraft 402, according to examples of the subject disclosure. As described above, the examples of the subject disclosure are described here with reference to a fleet 400 of aircraft 402, however the apparatus and method are useful for any structure, vehicle, or device that is exposed to UV energy and has an organic containing UV coating (e.g., paint coating of the aircraft 402). Each aircraft 402, in certain examples, includes a body 404 and an interior 406. Various components of the body 404, in some examples, are made of composite materials including, but not limited to, the fuselage, the wings, etc. The exterior layer 108 of the body 404 includes the UV coating 102.

Each aircraft 402 includes one or more control systems which include, but are not limited to a propulsion system 410, an electrical system 414, a hydraulic system 412, and an environmental system 416. Any number of other systems may be included. Although an aerospace example is shown, the principles of the disclosure may be applied to other industries, such as the automotive industry. The system 100 described above is usable during any one or more of the stages of production, use, or maintenance of the aircraft 402.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method of measuring an effectiveness of an ultraviolet (UV) coating, the method comprising:
   irradiating the UV coating with UV energy comprising a predetermined spectrum of wavelengths;
   measuring an intensity of the UV energy reflected from the UV coating;
   comparing a measured intensity of the UV energy reflected from the UV coating with a previously measured intensity of the UV energy reflected from the UV coating to obtain comparison data; and
   determining, in response to the comparison data, the effectiveness of the UV coating.

2. The method of claim 1, wherein the predetermined spectrum of wavelengths is from about 100 nanometers to about 400 nanometers.

3. The method of claim 1, wherein the UV energy, irradiating the UV coating, is provided by a tunable UV generator.

4. The method of claim 1, wherein:
   the UV coating forms an exterior layer of a vehicle; and
   the UV coating comprises an organic polymer coating.

5. The method of claim 4, further comprising determining an initial intensity of the UV energy reflected from the UV coating subsequent to the coating of the exterior layer of the vehicle, and wherein the initial intensity is determined prior to a measurement of the previously measured intensity.

6. The method of claim 5, further comprising determining a degradation of the UV coating based on a comparison of the initial intensity and the previously measured intensity, wherein the effectiveness is based on the determined degradation.

7. The method of claim 6, further comprising calculating the measured intensity of the UV energy reflected from the UV coating based on an absorbance, a transmittance, and a reflectance of the UV energy reflected from the UV coating.

8. The method of claim 1, further comprising predicting, based on the effectiveness of the UV coating, a future effectiveness of the UV coating.

9. The method of claim 1, wherein:
   the UV coating is applied onto vehicles of a fleet of vehicles; and
   the method further comprises maintaining a history of measured UV intensities for each vehicle in the fleet of vehicles.

10. A system for measuring an effectiveness of an ultraviolet (UV) coating, the system comprising:
    a UV generator configured to irradiate the UV coating with UV energy;
    a UV sensor configured to measure an intensity of the UV energy reflected from the UV coating; and
    a UV analyzer configured to compare a measured intensity with a previously measured intensity of the UV energy reflected from the UV coating to obtain comparison data, and to determine, in response to the comparison data, the effectiveness of the UV coating.

11. The system of claim 10, wherein the UV energy comprises energy having a predetermined spectrum of wavelengths from about 100 nanometers to about 400 nanometers.

12. The system of claim 10, wherein the UV analyzer is further configured to determine an initial intensity of the UV energy reflected from the UV coating subsequent to an application of the UV coating on an exterior layer of a vehicle, and wherein the initial intensity is determined prior to a measurement of the previously measured intensity.

13. The system of claim 12, wherein the UV analyzer is further configured to determine a degradation of the UV coating based on a comparison of the initial intensity and the measured intensity, wherein the effectiveness is based on the determined degradation.

14. The system of claim 13, wherein the UV analyzer is further configured to calculate the measured intensity based on an absorbance, a transmittance, and a reflectance of the UV energy from the UV coating and the exterior layer of the vehicle.

15. The system of claim 10, wherein:
   the UV coating is applied onto vehicles of a fleet of vehicles; and
   the UV analyzer is further configured to maintain a history of measured UV intensities for each vehicle in the fleet of vehicles.

16. The system of claim 10, wherein the UV generator comprises a tunable UV generator.

17. An apparatus comprising at least one computing device that is configured for performing actions, where the at least one computing device includes a processor and a local memory, the actions comprising:
   irradiating a UV coating with UV energy comprising a predetermined spectrum of wavelengths;
   measuring an intensity of the UV energy reflected from the UV coating;
   comparing a measured intensity of the UV energy reflected from the UV coating with a previously measured intensity of the UV energy reflected from the UV coating to obtain comparison data; and
   determining, in response to the comparison data, an effectiveness of the UV coating.

18. The apparatus of claim 17, wherein the predetermined spectrum of wavelengths is from about 100 nanometers to about 400 nanometers.

19. The apparatus of claim 17, further comprising determining an initial intensity of the UV energy reflected from the UV coating subsequent to an application of the UV coating on an exterior layer of a vehicle, and wherein the initial intensity is determined prior to a measurement of the previously measured intensity.

20. The apparatus of claim 19, wherein the actions further comprise determining a degradation of the UV coating based on a comparison of the initial intensity and the previously measured intensity, wherein the effectiveness is based on the determined degradation.

* * * * *